UNITED STATES PATENT OFFICE.

CHARLES M. MARTIN, OF NEW YORK, N. Y., ASSIGNOR TO THE WASHINGTON FIRE EXTINGUISHER MANUFACTURING COMPANY, OF WASHINGTON, DISTRICT OF COLUMBIA.

GENERATING GASES IN FIRE-EXTINGUISHERS.

SPECIFICATION forming part of Letters Patent No. 246,897, dated September 13, 1881.

Application filed February 19, 1881. (No specimens.)

*To all whom it may concern:*

Be it known that I, CHAS. M. MARTIN, of the city and State of New York, have invented a new and Improved Method of and Composition for Generating Gases in Fire-Extinguishers; and I hereby declare the following to be a full, clear, and exact description thereof.

The object of my invention is, first, to provide a compound to be placed within a fire-extinguisher to produce gas, said compound being of such a pasty or viscous consistency as to lack mobility to the extent of not splashing out of an unstoppered vessel within the extinguisher when such extinguisher is being handled; and, secondly, in so constituting the said pasty or viscous compound that it will, on being thrown into a solution of bicarbonate of soda within the extinguisher, generate quickly and certainly a large volume of gases which are non-supporters of combustion.

My invention is an improvement upon the method of gas-generation covered in an application filed of even date with this; and the improvement specifically consists in mixing with the dry sulphates of ammonia and of alumina a small proportion of sulphuric acid, which renders the mass pasty or viscous and adhesive in character; and it further consists in throwing the said viscous or pasty mass into a solution of bicarbonate of soda within a closed vessel, whereby the heat generated by the sulphuric acid in contact with water accelerates the subsequent chemical reactions, as hereinafter described.

In the improved method, using the following ingredients—sulphate of ammonia, sulphate of alumina, bicarbonate of soda, and water—I find a more prompt reaction occurs if the temperature of the water be raised in a slight degree. I accomplish this by the introduction into the water of a small amount of commercial sulphuric acid in the following manner: Before delivering the commercial sulphates of ammonia and alumina into the interior vessel of the extinguisher I slightly moisten them with sulphuric acid, taking care that the moistening or dampening shall be to such a slight degree that there shall be no excess of acid in a liquid form in the interior chamber. This moistening with sulphuric acid makes a pasty or viscous charge for the interior vessel, which adheres so to the vessel that it will not be thrown or splashed out of the said interior vessel, though the latter be left uncorked or uncovered, in any ordinary handling of the extinguisher. When the viscous charge is precipitated into water and bicarbonate of soda by any of the well-known mechanical means the sulphuric acid by chemical action raises slightly the temperature of the water, and the reactions for producing the gases are thereby accelerated.

As the rendering of the saline mixture adhesive is the chief feature of my invention, this may be accomplished by the addition of other substances than sulphuric acid, which is the acid I prefer.

Having thus described my invention, what I claim as new, and desire to secure by Letters Patent, is—

1. The improved method herein described for generating gases in fire-extinguishers, consisting, essentially, in throwing a mixture of sulphate of ammonia, sulphate of alumina, and sulphuric acid, said mixture being previously brought to a viscous condition, into a solution of bicarbonate of soda, previously kept apart from the action of said viscous compound, within the body of an extinguisher, substantially as set forth.

2. As a material for producing gas in fire-extinguishers, a pasty saline composition, rendered viscous by acid or other equivalent means, and thereby adapted to be retained in the interior vessel of said extinguisher, for the purpose described.

CHAS. M. MARTIN.

Witnesses:
JNO. L. CONDRON,
R. K. EVANS.